Patented Mar. 26, 1929.

1,706,865

UNITED STATES PATENT OFFICE.

WILLIAM ROSCOE TUCKER, OF DAWSONVILLE, GEORGIA.

PROCESS OF MOLDING FACED CONCRETE UNITS.

No Drawing.　　Application filed February 18, 1928.　Serial No. 255,496.

This invention pertains to the molding of concrete units having projecting sunken-jointed faces, and has for its object the most economical and practical production of concrete units of this kind.

In molding a faced concrete unit by this process where irregular broken stones, sized rock screenings, and water-soluble glue are used, respectively, as facing material, filling material, and adhesive substance, the stones are placed face-down on the bottom of the mold in the positions that they are to occupy in the face of the finished unit, and the spaces between the stones are filled with screenings to a somewhat greater depth than that which the face joints are to have.

The bottom part of the mold, bearing the stones and screenings, and maintained in a level position, is now lowered into a thin glue solution, where it is allowed to remain until the solution, rising through the perforations in the bottom of the mold, submerges the portion of the stones that are to show in the face of the finished unit, and also covers the screenings to the same level.

The work is next raised from the solution, the stones and screenings allowed to drain and dry, and all screenings not attached by the glue dumped by partly inverting the work.

The voids between the screenings may now be filled and a tighter surface obtained, if desired, by shaking in finer screenings, and removing the surplus fine screenings by directing a current of air downward against the work.

The mold is next assembled and in order to aid adhesion between the fresh concrete mixture and the stones and screenings, it is well to wet all exposed surfaces of the stones and screenings by fog-spraying with water.

Where a facing mixture and a backing mixture are used, the facing mixture is first applied and worked well in between the stones and against the screenings, after which the mold is filled with the backing mixture, and the unit is left to harden.

In molding concrete units having more than one face, by this process, the part, or parts, of the mold covering such additional face, or faces, is treated just as outlined for the bottom part of the mold, until the mold is ready for assembling, when a layer of the facing mixture is applied, like plaster, to the additional face, or faces, in order to hold the finer screenings in place, after which the mold is assembled, partitions are inserted parallel to the faces being treated, and the remainder of the facing mixture applied.

When the unit is hard enough to withstand handling the face, or faces, are soaked in water, or are steamed, until the glue is thoroughly softened, the mold is removed, the glue and loose screenings washed off, and the curing of the unit continued in the usual manner.

This process excels all others for the molding of concrete units of this kind, in that the glued screenings perform the four services of (first) holding the facing stones in position until the unit hardens, (second) protecting the exposed portion of the facing stones from the fresh facing mixture, (third) regulating the depth of the face joints, and (fourth) giving to the sub-face of the unit, or back walls of the face joints, a close rock-textured finish.

Furthermore, concrete units made by this process present a unique and pleasing appearance, possess the light and shade effect which adds so much to the beauty and refinement of buildings, and, by the use of selected materials, can be made as varied, artistic, and colorful as desired.

I claim:

The process of molding faced concrete units consisting in placing the facing stones on the bottom of the mold, filling the spaces between the stones with a suitable filling material, as rock screenings; submerging the stones and screenings to the desired level in a solution of a suitable adhesive substance, as glue; draining and drying the submerged portion of the stones and screenings; eliminating all unattached screenings; and filling the mold with the facing, and backing concrete mixtures, substantially as herein described.

WILLIAM ROSCOE TUCKER.